United States Patent
Yao et al.

(10) Patent No.: US 11,144,871 B2
(45) Date of Patent: Oct. 12, 2021

(54) OPTIMIZED CONTAINER MANAGEMENT SYSTEM

(71) Applicant: SAP SE, Walldorf (DE)

(72) Inventors: Leiyi Yao, Shanghai (CN); Xin Chen, Shanghai (CN); Ben Xu, Shanghai (CN); Harald Hengelbrock, Heidelberg (DE)

(73) Assignee: SAP SE, Walldorf (DE)

( * ) Notice: Subject to any disclaimer, the term of this patent is extended or adjusted under 35 U.S.C. 154(b) by 1008 days.

(21) Appl. No.: 15/168,415

(22) Filed: May 31, 2016

(65) Prior Publication Data
US 2017/0344944 A1 Nov. 30, 2017

(51) Int. Cl.
*G06Q 10/08* (2012.01)

(52) U.S. Cl.
CPC ... *G06Q 10/08355* (2013.01); *G06Q 10/0834* (2013.01)

(58) Field of Classification Search
CPC ............ G06Q 10/08355; G06Q 10/0834
USPC .............................................. 705/338
See application file for complete search history.

(56) References Cited

U.S. PATENT DOCUMENTS

| | | | | |
|---|---|---|---|---|
| 9,505,559 B1 * | 11/2016 | Cai | ............ | B65G 47/57 |
| 2003/0074273 A1 * | 4/2003 | Miller | ............ | G06Q 30/06 |
| | | | | 705/26.1 |
| 2012/0005238 A1 * | 1/2012 | Jebara | ............ | G06Q 30/02 |
| | | | | 707/798 |
| 2015/0248639 A1 * | 9/2015 | Maney | ............ | G06Q 10/08345 |
| | | | | 705/335 |
| 2015/0254589 A1 * | 9/2015 | Saxena | ............ | G06Q 10/06315 |
| | | | | 705/7.25 |
| 2016/0307155 A1 * | 10/2016 | Bell | ............ | G06Q 10/06315 |

OTHER PUBLICATIONS

Managing Returnable Containers Logistics—A Case Study Part I—Physical and Information Flow Analysis Published by Open Access Publisher (Year: 2011).*

* cited by examiner

*Primary Examiner* — Zeina Elchanti
(74) *Attorney, Agent, or Firm* — Fish & Richardson P.C.

(57) ABSTRACT

In optimized container management system, a booking request with customer locations, booking time, container type, movement mode, depot locations and depot locations stock information are received as input in a solver in a container management system received in a container management system. Based on the movement mode of booking request received by customer, solver algorithm is invoked to build a bipartite graph. A bipartite graph with nodes representing customer locations and depot locations are generated, based on the movement mode. Edges between the customer locations and the depot locations are generated based on a container balancing criteria of a solver algorithm. For remaining booking request, edges between the customer locations and the depot locations are generated based on a cost minimization criteria of the solver algorithm. The depot locations are assigned to the corresponding customer locations based on satisfying the container balancing criteria and the cost minimization criteria.

12 Claims, 13 Drawing Sheets

300B

| | Surplus > Safety stock | Cost | Strategy |
|---|---|---|---|
| C1 ⟶ D1 314 | YES 316 | 10 318 | ✓ |
| C1 ⟶ D2 320 | YES 322 | 20 324 | -- |
| C1 ⟶ D3 326 | NO 328 | 10 330 | -- |
| C2 ⟶ D3 332 | NO 334 | 10 336 | ✓ |
| C2 ⟶ D4 338 | NO 340 | 15 342 | -- |

FIG. 3B

| | Surplus < Safety stock or shortage | Surplus Stock | Cost | Strategy |
|---|---|---|---|---|
| C1 →D1 514 | NO 518 | 20 516 | 10 520 | -- |
| C1 →D2 522 | YES 526 | 2 524 | 20 528 | ✓ |
| C1 →D3 530 | NO 532 | 35 534 | -- | -- |
| C2 →D3 536 | NO 538 | 35 540 | 10 542 | ✓ |
| C2 →D4 544 | NO 546 | 40 548 | 15 550 | -- |

OPTIMIZED CONTAINER MANAGEMENT SYSTEM

FIELD

Illustrated embodiments generally relate to data processing, and more particularly to container management system.

BACKGROUND

Container shipping companies manage a balance between supply and demand of containers in various locations. Various operations in container management system include managing transportation of empty containers, and assigning customers to a specific location for pick up and return of containers. Returned containers have an impact on pickup of containers. There may be situations where a feasible pickup location cannot be identified for a customer, or returned containers exceed the capacity of a certain depot location. As a result, the container shipping companies may not be able to fulfill customer request, or pay high transportation cost for the empty container repositioning. When customer locations are not tracked, optimizing pick-up, return and street turn of containers are challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIGS. 3A and 3B in combination illustrates an exemplary use case of assigning customer location to depot location by solver in the customer management system during container pick-up, according to one embodiment.

FIG. 5A and FIG. 5B in combination illustrates an exemplary use case of assigning customer locations to depot locations by solver in the container management system during container return, according to one embodiment.

DETAILED DESCRIPTION

Embodiments of techniques for optimized container management system are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A depot is a location owned or managed by a container shipping company where containers are stored. The depot may be inside a harbor or in a city. The depot has a safety stock and a maximum stock threshold. The empty containers stocked in the depot have to be maintained higher than the safety stock, and lower than the maximum stock threshold. A vessel is used for transporting containers between depots. The containers may be transported between depots using two types of routing methods based on the type and combination of means of transport used. The first method referred to as inland moving, is a direct service or lane service using one of the means of transport such as trucks, trains or barges. The second method referred to as intermodal transportation uses a combination of services from trucks, trains, barges, etc.

Container management involves operation costs such as handling cost, transportation cost, fixed cost, and storage cost. Handling cost is the expense related to labor such as loading/unloading containers from one means of transport to another means of transport. Transportation cost is the expense involved in moving containers between various locations. When a customer uses a haulage contractor for movement of containers it is referred to as merchant haulage. When a container shipping company uses its own haulage contractor to provide movement of containers to the customers it is referred to as carrier haulage. Based on whether merchant haulage or carrier haulage is used transportation cost varies. If merchant haulage is used, the customer pays the transportation cost. If carrier haulage is used, the shipping company pays the transportation cost. Storage cost is the expense for storing empty containers in depots, which is generally calculated by the number of days a container stays in a depot location.

Figure 1:
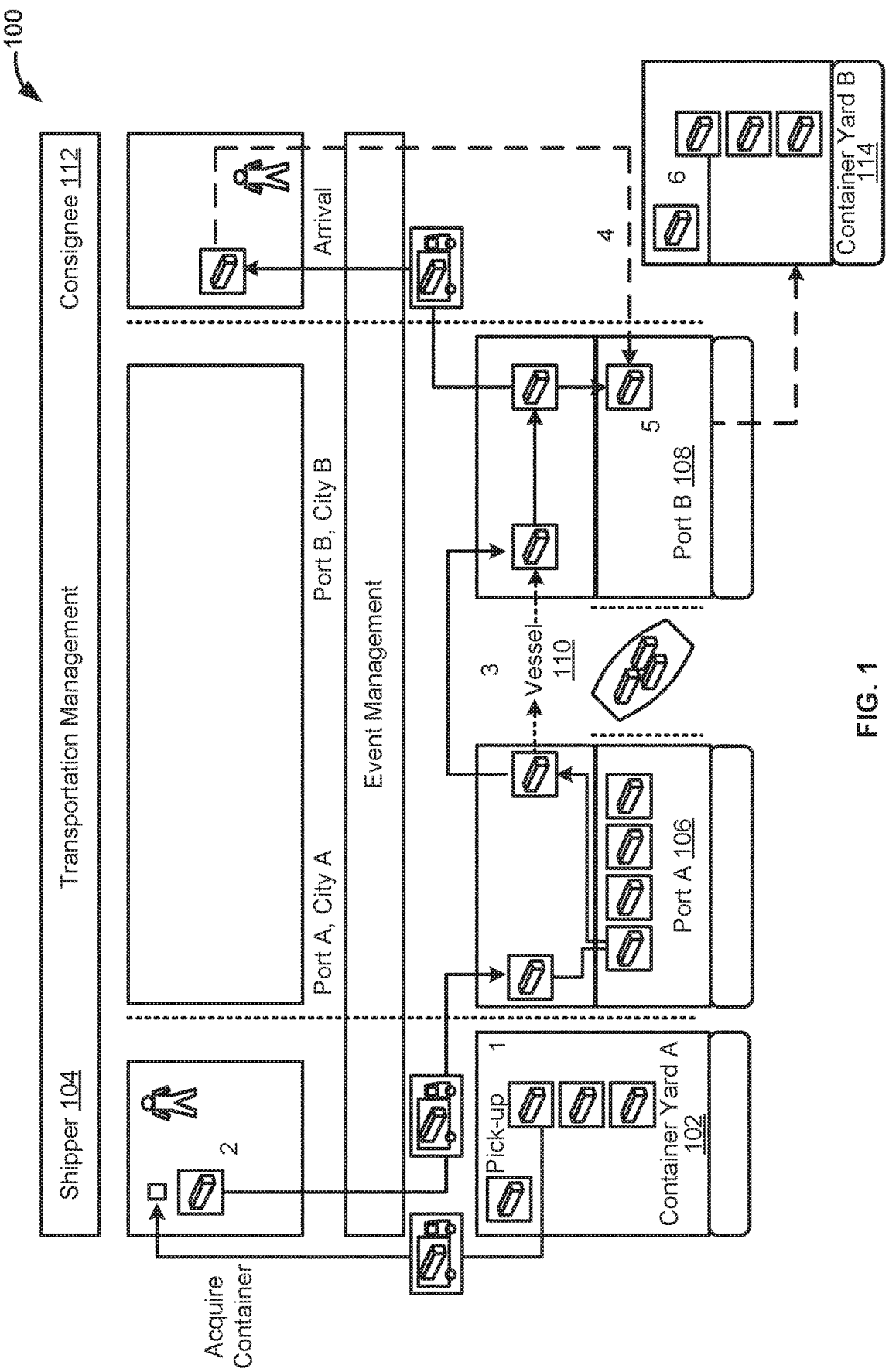
FIG. 1 is a block diagram illustrating container's transport lifecycle in container management system, according to one embodiment.

FIG. 1 is a block diagram illustrating container's transport lifecycle in container management system 100, according to one embodiment. A booking request may be received in a container management system from a shipper for pick-up of a container. Container yard A 102 is a depot location where containers are available for pick-up. Shipper 104 picks up container from the container yard A 102. The shipper 104 uses the container to transport items from port A 106 in city A to port B 108 in city B. The container with items is loaded to a vessel 110 in port A 106. Port A is also referred to as port of loading departure. The container arrives at port B 108 also referred to as port of discharge. From port B 108 the container with items is discharged or delivered to consignee 112. The consignee 112 may return the container to port B 108. From port B 108 the container is moved to depot container yard B 114 where the container is stored until another pick-up. The booking request is received as an input in the container management system, and the booking request is fulfilled when a depot location with containers is identified as output. In a typical container management system the volume of booking requests received is high in denominations of millions of booking requests per day.

Figure 2:
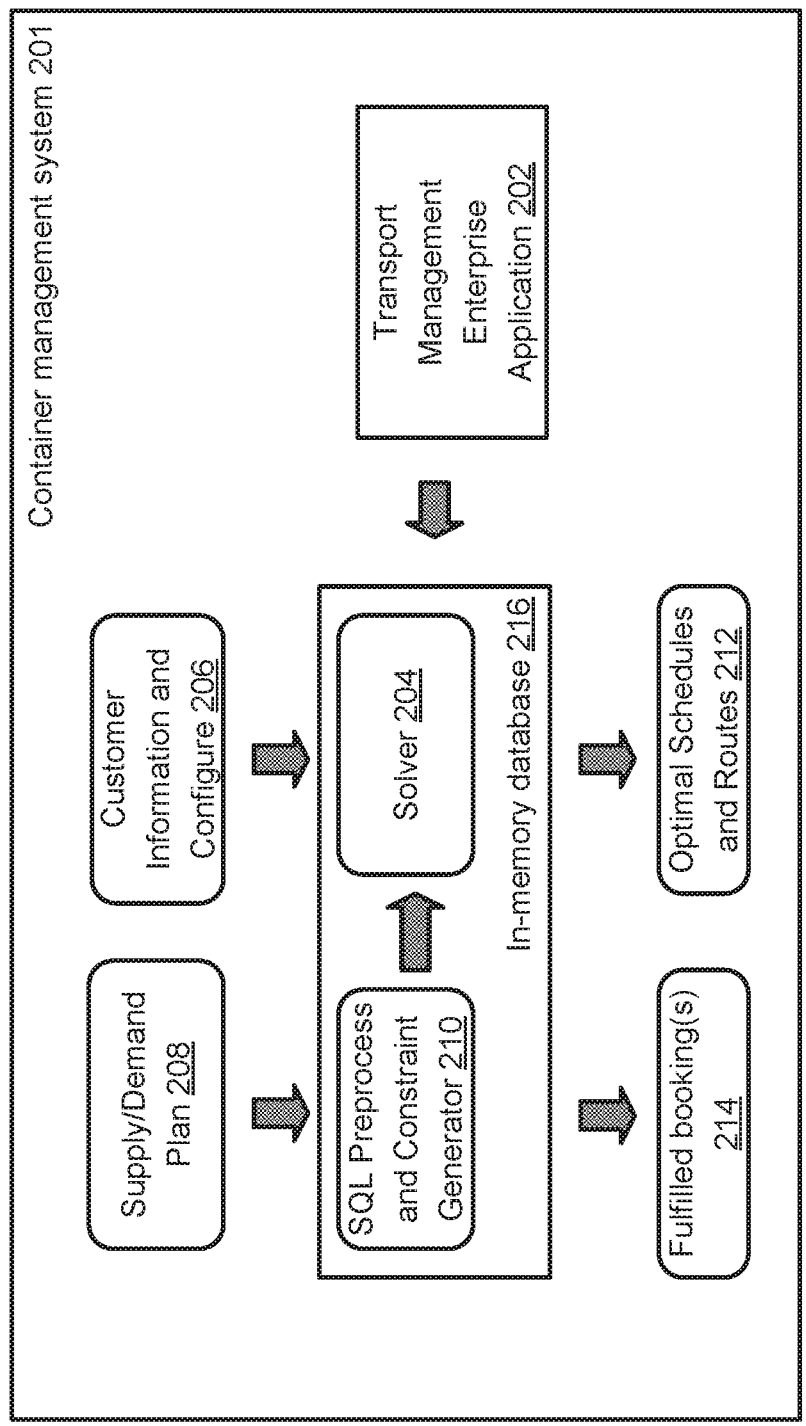
FIG. 2 is a block diagram illustrating process flow in a container management system, according to one embodiment.

FIG. 2 is a block diagram illustrating process flow 200 in container management system, according to one embodiment. Transport management enterprise application 202 creates and manages booking orders or booking requests, freight bookings, transportation services, transportation costs, etc. Data associated with booking requests are received as input from the transport management enterprise application 202 to solver 204, in container management system 201. Solver 204 may include pick-up solver, return solver and street-turn solver. Solver may be an algorithm or software applications implementing program logic in a programming language. Depending on the booking request received appropriate solver algorithm may be invoked. Transport management enterprise application 202 provides input such as means of transport, transportation cost, etc., to solver 204. Customer information, container stock configuration information, cost information and supply and demand plan information are received as input in the solver 204, in the container management system 201. Based on the received input, the pick-up, return and street-turn solver fulfills the booking requests by generating or suggesting optimal schedules and routes with depot locations and customer locations. Customer information and configure module 206 provides inputs such as route information, booking information, depot location stock information, safety stock and maximum stock configure information and cost information to the solver 204. For example, a booking request that describes the fields related to booking information for a customer request is shown in booking request table I with various parameters below:

TABLE 1

| Name | Description |
| --- | --- |
| Booking ID | A unique number to tag the booking |
| Customer location | The location of customer |
| Start time | A time when a customer can start transporting the empty containers |
| Booking time | A time when an empty container need to be arrived at a depot |
| Container type | Type of a container, e.g. Twenty-foot Equivalent Unit (TEU) or Forty-foot Equivalent Unit (FEU) |
| Quantity | Number of containers |
| Mode | Pick-up, return or street turn |

The unique number to identify the booking is specified in booking ID parameter. Location of the customer is specified in customer location parameter. Start time parameter indicates a time when a customer can start transporting the empty containers. Booking time is a time when the empty container is required to arrive at a depot location. Container type parameter indicates the type of container for example, twenty-foot equivalent unit (TEU), forty-foot equivalent unit (FEU). Quantity parameter indicates the number of containers required to meet customer request. Mode parameter or movement mode indicates the mode of service required by the customer in the booking request such as container pick-up, container return, or street turn of containers.

Cost associated with a depot location is available in a depot cost table. For example, Table 2 shows various cost related parameters associated with a depot location.

TABLE 2

| Name | Description |
| --- | --- |
| Location | Location name |
| Container type | Type of a container, e.g. Twenty-foot Equivalent Unit (TEU) or Forty-foot Equivalent Unit (FEU) |
| Storage cost per unit | The cost to store a unit of container in a depot |
| Handling cost per unit | The cost to load/unload a container, related to depot location |

Location name of the depot is specified in the location parameter. Container type parameter indicates the type of container, for example, twenty-foot equivalent unit (TEU), forty-foot equivalent unit (FEU). Cost to store a unit of container in a depot is specified in storage cost per unit parameter. Cost to load and unload a container in a depot location is specified in handling cost per unit parameter.

Route information associated with a booking request is available in route information table with various parameters as shown below in Table 3:

TABLE 3

| Name | Description |
| --- | --- |
| From location | Start location of a trip |
| To location | Destination of a trip |
| Mode of transportation | Means of transportation |
| Duration | The period of time between From location and To location |
| Cost | The total cost when a container is transported on the route |

Start location of a trip is specified in 'from location' parameter, and destination of the trip is specified in 'to location' parameter. Means of transport is specified in the mode of transportation parameter. The period of time for transportation between 'from location' and 'to location' is specified in duration parameter. Total cost involved when the container is transported in the route is specified in cost parameter.

Input provided by supply and demand plan module 208 is specified in the supply demand plan table with various parameters as shown below:

TABLE 4

| Name | Description |
| --- | --- |
| Time | The time of supply and demand data |
| Location | Location name |
| Container type | Type of a container, e.g. Twenty-foot Equivalent Unit (TEU) or Forty-foot Equivalent Unit (FEU) |
| Supply | Number of available containers |
| Demand | Number of required containers |

Time of supply and demand data is the time interval between supply and demand of containers taking place in certain location, and is specified in parameter time. Location name of the supply and demand plan is specified in the location.

Number of available containers is specified in parameter supply, and the number of required containers is specified in the demand parameter.

Stock information of the containers are available in the stock configurations table as shown below in Table 5:

TABLE 5

| Name | Description |
| --- | --- |
| Location | Location name |
| Container type | Type of a container, e.g. Twenty-foot Equivalent Unit (TEU) or Forty-foot Equivalent Unit (FEU) |
| Safety stock | The quantity of number of containers needs to be maintained in a depot to avoid the risk of stock out due to the uncertainty of supply of demand |
| Maximum stock | Maximum capacity of a depot |

Safety stock indicates the minimum number of containers required to be maintained in a depot location to avoid the risk of stock out due to the uncertainty of supply and demand. Maximum capacity of the depot location is specified in maximum stock parameter. SQL preprocessor and constraint generator module 210, included in the container management system 201 gathers the input information from the supply and demand plan module 208, and generates a mathematical model based on this information. Solver 204, receives the mathematical model generated by the SQL preprocessor and constraint generator module 210, and generates optimal schedules and routes 212 corresponding to the booking request. For pick-up of containers, optimal schedule may be identified if a depot location with quantity of containers greater than the safety stock of containers is identified. Similarly, for return of containers, optimal schedule may be identified if a depot location with quantity of containers less than the safety stock of containers is identified. Optimal schedule may also be identified if operation cost such as transportation cost, storage cost, handling cost, etc., of a depot location is minimum. Optimal schedule may also be identified based on the shortest distance between the depot locations. Booking requests that are fulfilled are specified in fulfilled bookings 214. The SQL preprocessor and constraint generator module 210 and the solver 204 are executing in an in-memory database 216.

The fulfilled bookings are specified in a route result table with various parameters as shown below in Table 6.

TABLE 6

| Name | Description |
| --- | --- |
| Route ID | ID is used in the solver |
| Booking ID | A unique number to tag the booking |
| From location | Start location of a trip |
| To location | Destination of a trip |
| From time | Start time of a trip |
| To time | End time of a trip |
| Container Type | Type of a container, e.g. Twenty-foot Equivalent Unit (TEU) or Forty-foot Equivalent Unit (FEU) |
| Quantity | The number of containers transported on the route |
| Storage cost | Storage cost on the route |
| Handling cost | Handling cost on the route |
| Transportation cost | Transpiration cost on the route |
| Total cost | Total cost of three costs above |
| mode | Pick-up, return or street turn |

Route ID is used to identify a route for fulfilling the booking request, and booking ID is a unique number used to tag a booking. Start location of a trip is specified in 'from location', and destination of the trip is specified in 'to location'. Start time of the trip is specified in 'from time' and the end time of the trip is specified in 'to time'. Number of containers transported in the route is specified in quantity parameter. Sum of storage cost, handling cost and transportation cost associated with the route is specified in the total cost. Mode indicates the mode of booking request such as container pick-up, container return or street-turn of containers.

Figure 3A:
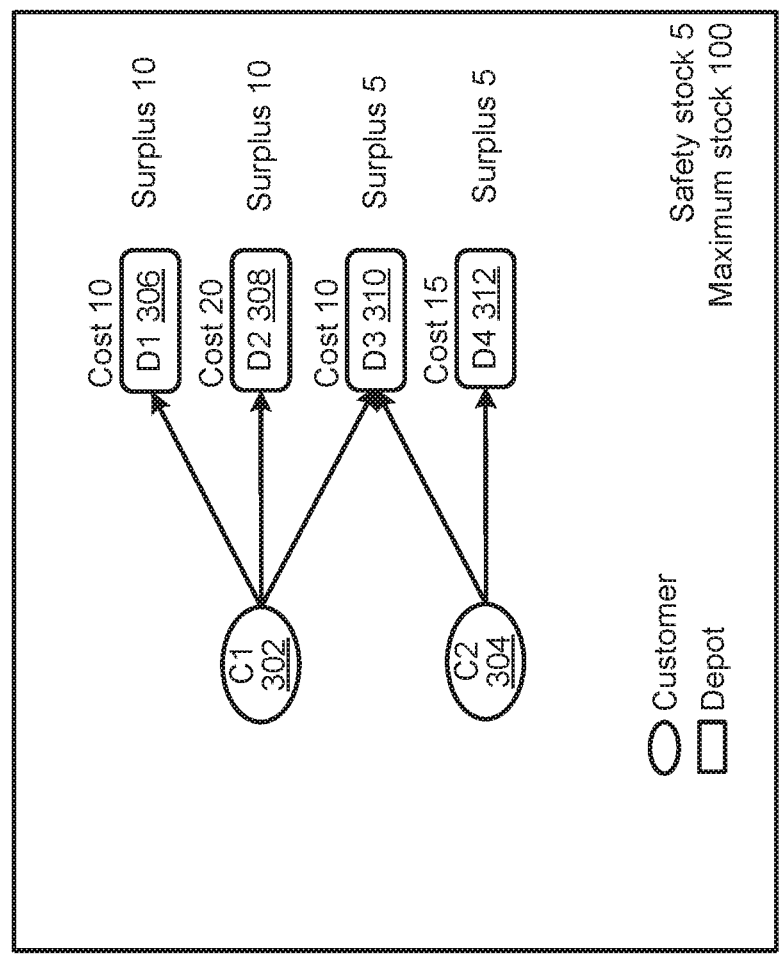

FIG. 3A and FIG. 3B in combination illustrates an exemplary use case 300A of assigning customer location to depot location by solver in the customer management system during container pick up, according to one embodiment. Customer locations C1 302 and C2 304, and depot locations D1 306, D2 308, D3 310 and D4 312 are considered. Booking requests are received from customers in customer location C1 and customer location C2 for pick-up of containers. Pick-up solver algorithm is executed to identify pick-up depot locations corresponding to customer locations C1 302 and C2 304. Pick-up solver algorithm has two stages or criteria, a first balancing stage or balancing criteria, and a second cost minimization stage or cost minimization criteria. The first balancing criterion of the pick-up solver algorithm is executed to fulfill the booking requests. If some booking requests referred to as remaining booking requests are not fulfilled with the first balancing criteria, are executed with the second cost minimization criteria of the pick-up solver algorithm. If some of the remaining booking requests are unfulfilled after the execution of the second cost minimization criteria, they are referred to as unfulfilled booking request. Such unfulfilled booking requests are reported as an alert or error in a graphical user interface of the container management system. For identifying the pick-up depot location, a bipartite graph is constructed between customer locations and depot locations. Based on the first balancing criteria, an edge is added to the bipartite graph between a customer location and a depot location when quantity of surplus containers is greater than the quantity of safety stock of containers. In this exemplary use case, quantity of surplus containers in depot location D1 306 is '10', and the quantity of safety stock of containers is '5'. Since the quantity of surplus containers '10' in depot location D1 306 is greater than the quantity of safety stock of containers '5', an edge is added to the bipartite graph between customer location C1 302 and depot location D1 306. Similarly, since the quantity of surplus containers '10' in depot location D2 308 is greater than the quantity of safety stock of containers '5', an edge is added to the bipartite graph between customer location C1 302 and depot location D2 308. Based on the second cost minimization criteria, an edge is added to the bipartite graph between the customer locations and the depot locations, based on the remaining booking request where the quantity of surplus containers is greater than '0' according to optimal schedule and route. Accordingly, edges are generated between customer location C1 302 and depot location D3 310, between customer location C2 304 and depot location D3 310, and between customer location C2 304 and depot location D4 312.

Based on the bipartite graph, table 300B is generated as shown in FIG. 3B. The edge between the customer location C1 302 and the depot location D1 306, is represented with a notation C1→D1 as shown in 314. For the representation C1→D1 314, the quantity of surplus containers in depot location 'D1' '10' is greater than the quantity of safety stock of containers '5', accordingly a result of balancing criteria 'yes' 316 is determined for the balancing criteria when surplus>safety stock. Cost of the transportation between the customer location C1 302 and the depot location D1 306 is '10' 318. For the representation of edge with notation C1→D2 as shown in 320, result of balancing criteria 'yes' 322 is indicated for the balancing criteria surplus>safety stock, and the transportation cost is '20' 324. For the representation of edge between C1→D3 326, result of balancing criteria 'no' 328 is determined for surplus>safety stock, since the quantity of surplus containers in depot location 'D3' '5' is not greater than the quantity of safety stock of containers '5'. Cost of the transportation between the customer location C1 302 and the depot location D3 310 is '10' 330. For the representation of edge with notation C2→D3 as shown in 332, result of balancing criteria 'no' 334 is indicated for surplus>safety stock, since the quantity of surplus containers in depot location 'D3''5' is not greater than the quantity of safety stock of containers '5'. Cost of transportation between C2 and D3 is '10' 336. For the representation of edge with notation C2→D4 as shown in 338, result of balancing criteria 'no' 340 is indicated for surplus>safety stock, since the quantity of surplus containers in depot location 'D3' '5' is not greater than the quantity of safety stock of containers '5'. Cost of transportation between C2 and D4 is '15' 342. For customer location C1 302 depot location D1 306 is assigned because balancing constraint surplus is greater than safety stock, and the cost is minimum in comparison to depot location D2 308 as well. For customer location C2 304 depot location D3 310 is assigned because although balancing constraint is not fulfilled, the cost is minimum in comparison to depot location D4 312. Therefore, identifying optimal pick-up depot locations fulfills the booking requests from customers in customer location C1 and customer location C2 for pick-up of containers.

Figure 4:
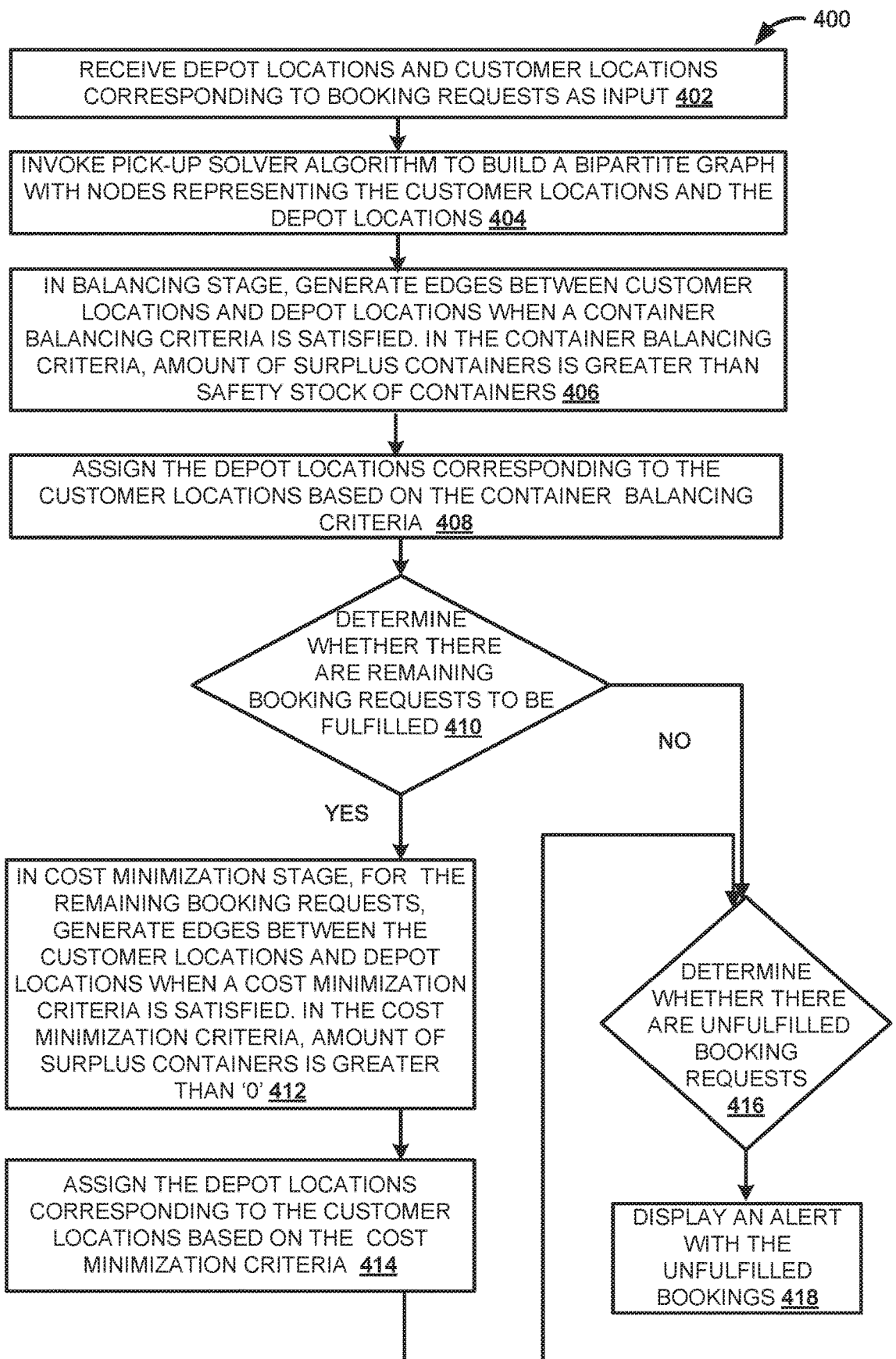
FIG. 4 is a flow chart illustrating execution of pick-up solver algorithm to assign customer location to depot location, according to one embodiment.

FIG. 4 is a flow chart illustrating execution of pick-up solver algorithm to assign customer location to depot location, according to one embodiment. At 402, depot locations and customer locations corresponding to a booking request are received as input. At 404, pick-up solver algorithm is invoked to build a bipartite graph with nodes representing the customer locations and the depot locations. At 406, the balancing stage of the pick-up solver algorithm is invoked/execute to generate edges between the customer locations and the depot locations when a container balancing criteria is satisfied. The container balancing criteria may be satisfied when the quantity of surplus containers is greater than safety stock of containers. At 408, the depot locations are assigned to the corresponding customer locations based on satisfying the container balancing criteria. At 410, it is determined whether there are remaining booking requests to be fulfilled. At 412, upon determining that there are remaining booking requests to be fulfilled, in cost minimization stage, for the remaining booking requests, edges between the remaining customer locations and the depot locations are generated when a cost minimization criteria is satisfied. At 414, the depot locations are assigned to the customer locations based on satisfying the cost minimization criteria. At 416, it is determined whether there are unfulfilled booking requests. Upon determining that there are unfulfilled booking requests, at 418, an alert with unfulfilled booking request is displayed.

Figure 5A:
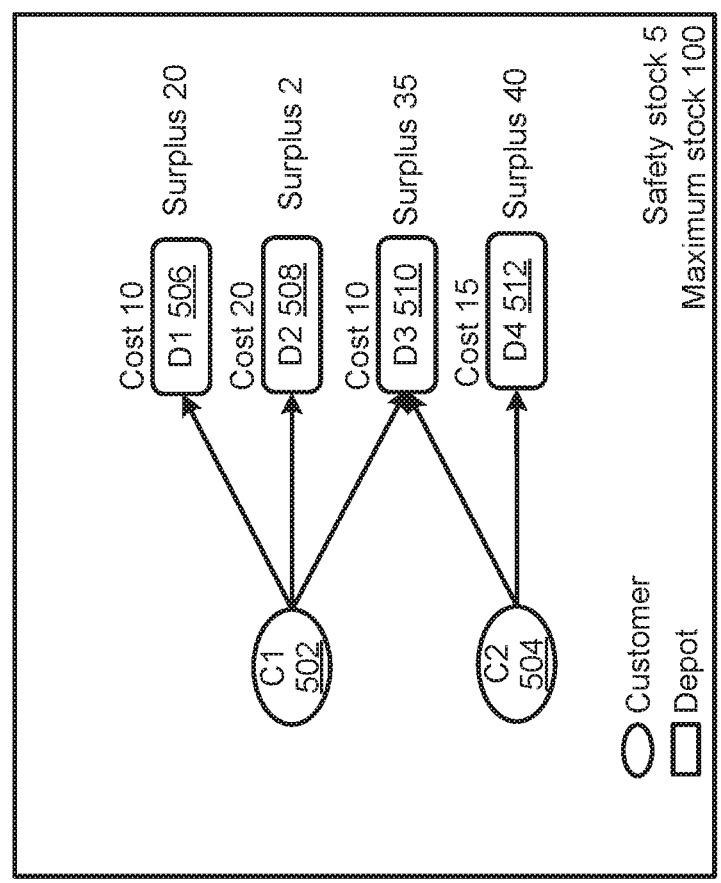

FIG. 5A and FIG. 5B in combination illustrates an exemplary use case 500A of assigning customer locations to depot locations by solver in the container management system during container return, according to one embodiment. Customer locations C1 502 and C2 504, and depot locations D1 506, D2 508, D3 510 and D4 512 are considered. Booking requests are received from customers in customer location C1 and customer location C2 for return of containers. Return solver algorithm is executed to identify return depot locations corresponding to customer locations C1 502 and C2 504 to return containers. A bipartite graph is generated between the customer locations and the depot locations. Return solver algorithm has two stages or criteria, a first balancing stage or balancing criteria, and a second cost minimization stage or cost minimization criteria. The first balancing criterion of the pick-up solver algorithm is executed to fulfill the booking requests. If some booking requests referred to as remaining booking requests are not fulfilled with the first balancing criteria, are executed with the second cost minimization criteria of the pick-up solver algorithm. If some of the remaining booking requests are unfulfilled after the execution of the second cost minimization criteria, they are referred to as unfulfilled booking request. Such unfulfilled booking requests are reported as an alert or error in a graphical user interface of the container management system. Based on the first balancing criteria, an edge is added to the bipartite graph between the customer location and the depot location when there is a shortage of containers or the number of surplus containers drops below safety stock. For example, in the example user case the quantity of surplus containers in depot location D2 508 is '2', which is less than the quantity of safety stock of containers '5'. Therefore, an edge is added to the bipartite graph between customer location C1 502 and depot location D2 508. Based on the second cost minimization criteria, an edge is added to the bipartite graph between the customer locations and the depot locations, based on the remaining booking order where the quantity of surplus containers in the depot location is less than the maximum stock of containers, and there is remaining space in the depot location. Quantity of surplus containers in the depot location D1 506 is '20', and the quantity of safety stock of containers is '5'. The quantity of surplus containers '20' in the depot location D1 506 is not less than the quantity of safety stock of containers '5', but less than the maximum stock of containers i.e., '100', and there is remaining space in the depot location D1 506. Therefore, an edge is added to the bipartite graph between the customer location C1 502 and the depot location D1 506. Similarly, edges are generated between the customer location C2 504 and the depot location D3 510, and between customer location C2 504 and depot location D4 512.

Based on the bipartite graph, table 500B is constructed as shown in FIG. 5B. The edge between C1 502 and the depot location D1 506, is represented as C1→D1 514. For the representation C1→D1 514, the quantity of surplus containers '20' 516 in depot location 'D1' is not less than the quantity of safety stock of containers '5', but less than maximum stock of containers '100', accordingly a result of balancing criteria 'no' 518 is marked for the balancing criteria surplus<safety stock. Cost of the transportation between the customer location C1 502 and the depot location D1 506 is '10' 520. For the representation of edge C1→D2 522, the quantity of surplus containers '2' 524 in depot location D2 508 is less than the quantity of safety stock of containers '5', accordingly result of balancing criteria 'yes' 526 is indicated for surplus<safety stock. Cost of transportation between C1 and D2 is '20' 528. For the edge between C1→D3 530, result of balancing criteria 'no' 532 is indicated for the balancing criteria surplus<safety stock, since the quantity of surplus containers '35' 534 in depot location D3 510 is not less than the quantity of safety stock of containers '5', but less than maximum stock of containers '100'. For the edge C2→D3 536, result of balancing criteria 'no' 538 is indicated for the balancing criteria surplus<safety stock, since the quantity of surplus containers '35' 540 in depot location D3 510 is less than the quantity of safety stock of containers '5'. Cost of transportation between C2 and D3 is '10' 542. For the edge C2→D4 544, result of balancing criteria 'no' 546 is indicated for the balancing criteria surplus<safety stock, since the quantity of surplus containers '40' 548 in depot location D4 512 is not less than the quantity of safety stock of containers '5'. Cost of transportation between C2 and D4 is '15' 550. For customer location C1 502, depot location D2 508 is assigned because considering the balancing constraint, surplus is less than safety stock, i.e., there is a shortage of containers in depot D2 508. Accordingly, a selection is placed corresponding to edge representation C1→D2 as shown in 522. For customer location C2 504, depot location D3 510 is assigned because, although the balancing constraint is not fulfilled, the cost is minimum in depot location D3 510 in comparison to depot location D4 512. Accordingly, a selection is placed corresponding to edge representation C2→D3 as shown in 536. Therefore, identifying optimal return depot locations fulfills the booking requests from customers in customer location C1 and customer location C2 for return of containers.

Figure 6:
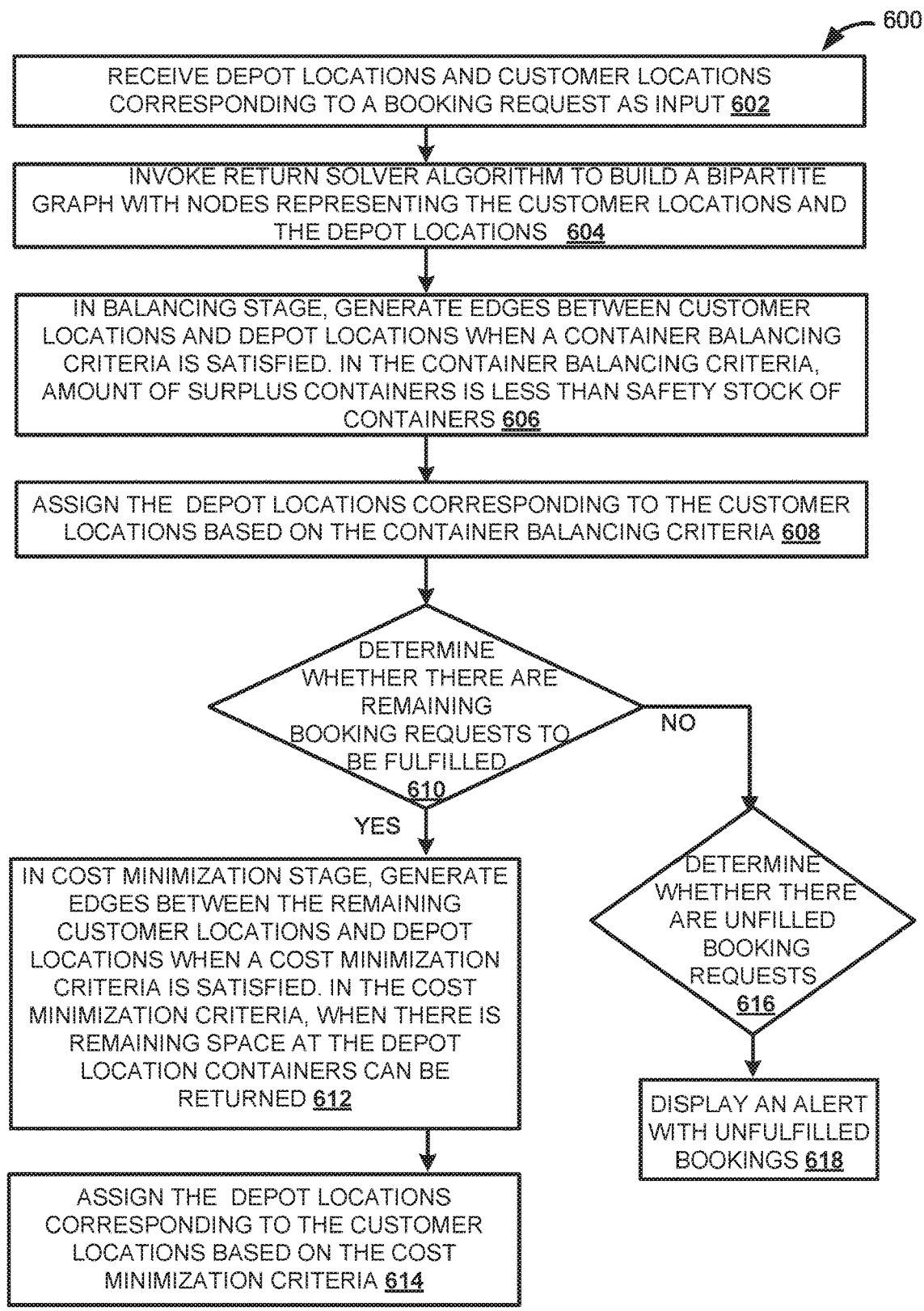
FIG. 6 is a flow chart illustrating execution of return solver algorithm to assign customer location to depot location, according to one embodiment.

FIG. 6 is a flow chart illustrating execution of return solver algorithm to assign customer location to depot location, according to one embodiment. At 602, depot locations and customer locations corresponding to a booking request are received as input. At 604, return solver algorithm is invoked to build a bipartite graph with nodes representing the customer locations and the depot locations. At 606, balancing stage of the return solver algorithm is executed to generate edges between the customer locations and the depot locations when a container balancing criteria is satisfied. In the container balancing criteria, quantity of surplus containers is lesser than safety stock of containers. At 608, the depot locations corresponding to the customer locations are assigned based on the balancing criteria, therefore fulfilling a booking request. At 610, it is determined whether there are remaining booking requests to be fulfilled. Upon determining that there are remaining booking requests to be fulfilled, at 612, in cost minimization stage, edges between the customer locations and the depot locations are generated when a cost minimization criteria is satisfied. At 614, the depot locations are assigned to the customer locations based on satisfying the cost minimization criteria. At 616, it is determined whether there are unfulfilled booking requests. Upon determining that there are unfulfilled booking requests, at 618, an alert with unfulfilled booking request is displayed.

Figure 7:
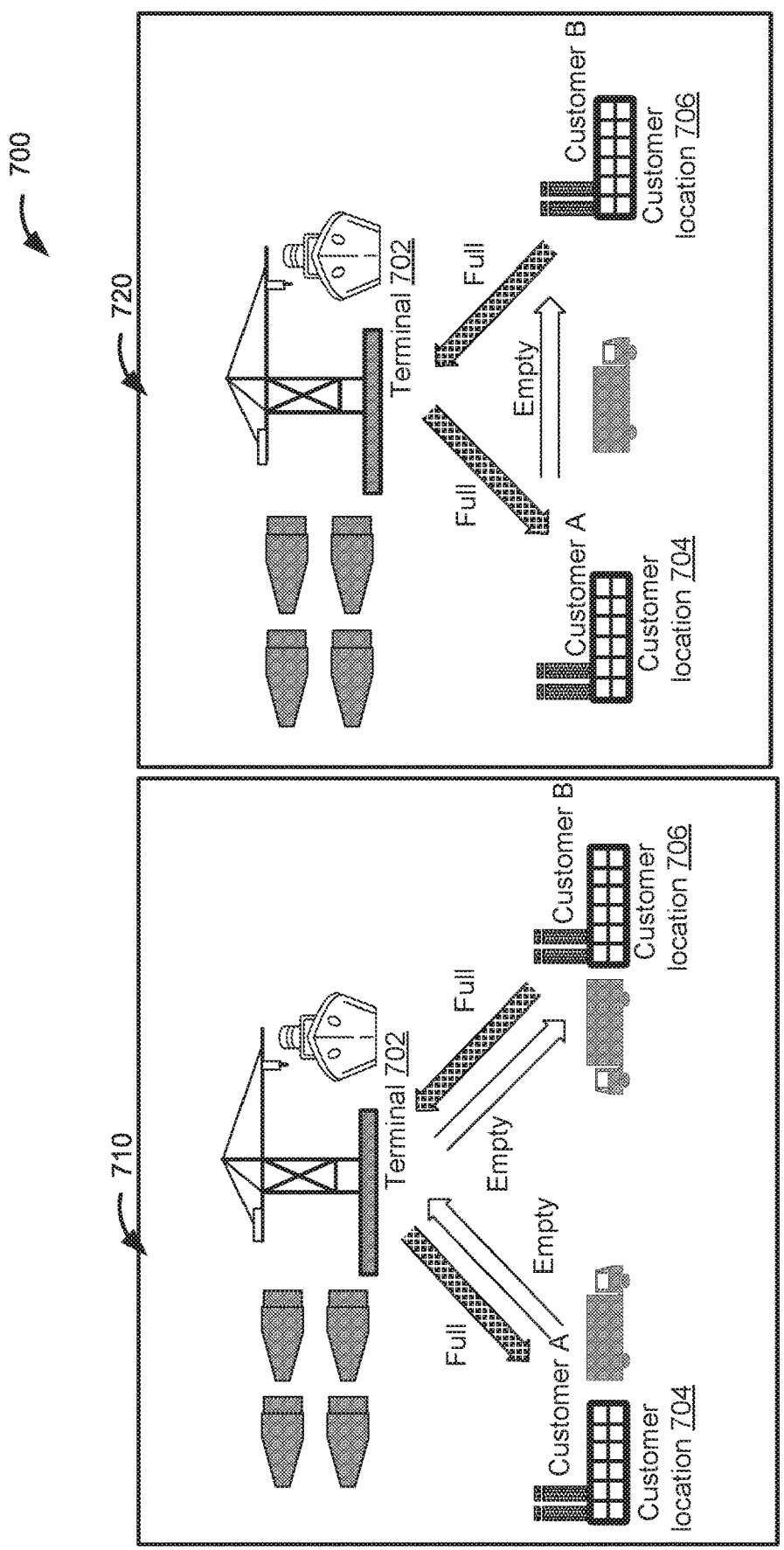
FIG. 7 illustrates an exemplary use case of pairing customer locations for pick-up and return of containers by solver in the container management system during street turn of containers, according to one embodiment.

FIG. 7 illustrates an exemplary use case 700 of pairing customer locations for pick-up and return of containers by solver in the container management system during street turn of containers, according to one embodiment. In scenario 710, terminal 702 is a container terminal where containers are transshipped between different transport vehicles during transportation. Loaded container is transported from terminal 702 to customer A at customer location 704, indicated by an arrow marked 'full'. When the container is unloaded at customer location 704, customer A returns empty container to the terminal 702. Similarly, loaded container is transported from terminal 702 to customer B at customer location 706, and an arrow marked 'full' indicates this. When the container is unloaded at customer location 706, customer A returns empty container to the terminal 702. In scenario 710, customer A and customer B pick up and return the containers individually at the terminal 702. In scenario 720, customer A intends to return the container and customer B intends to pick-up the container. With the street turn solver algorithm, customer A is paired with customer B i.e., return and pick-up are paired. Accordingly, the empty container returned by customer A may be picked-up by customer B instead of customer A returning the container to terminal 702. Customer A retains the empty container at customer location 704 until customer B picks it up.

Figure 8:
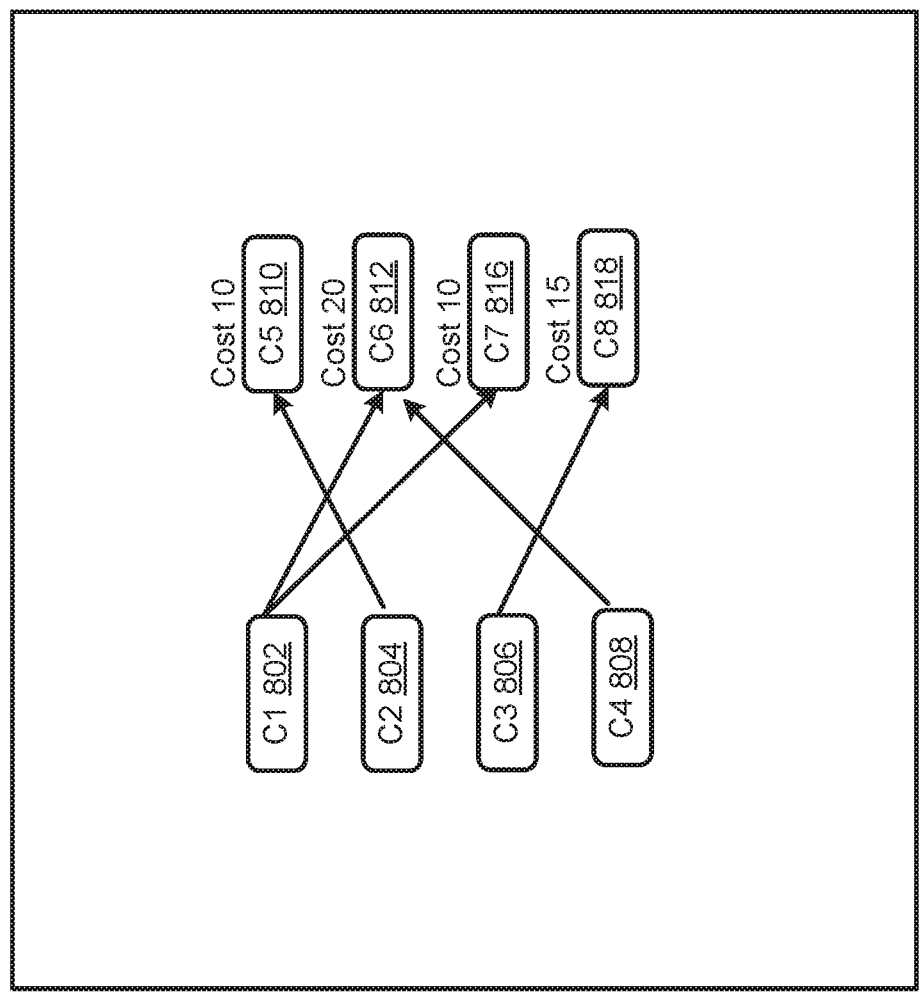
FIG. 8 is an exemplary use case illustrating execution of street-turn solver algorithm to identify customer location pairs, according to one embodiment.

FIG. 8 is an exemplary use case 800, illustrating execution of street-turn solver algorithm to identify customer location pairs, according to one embodiment. Customer locations C1 802, C2 804, C3 806, C4 808, C5 810, C6 812, C7 816 and C8 818 are considered. Street-turn solver algorithm is executed to pair customer locations such that a container pick-up customer location is paired with container return customer location. In the customer locations being paired, one customer location is a pick-up location and the other customer location is a return location. Based on movement mode of customer, a flag is specified. Some customers may choose to move and return containers, while some customers may remain or stay in their location for other customers to pick-up containers from them. This determines the movement mode of customers. For example, if the movement mode of the customer indicates that the customer location is return location, a flag 'yes' is specified, and if the movement mode of customer indicates that the customer location is pick-up location, a flag 'no' is specified. An edge is generated between customer locations C1 802 and C6 812, since (a) container pick-up time of C6 812 is within a one-hour tolerable limit of container return C1 802, and (b) container type of container locations C1 802 and C6 812 are identical or similar. Similarly, edges are generated between customer locations C1 802 and C7 816, C2 804 and C5 810, C3 806 and C8 818, C4 808 and C6 812. These edges satisfy both the criteria that container pick-up time and container return time are within one-hour tolerable time limit, and the container type is similar or identical the customer locations. The paired customer locations are filtered to identify the customer location pairs with a shortest possible route and minimum transportation cost. For example, the paired customer locations C1 802 and C6 812, C1 802 and C7 816, C2 804 and C5 810, C3 806 and C8 818, C4 808 and C6 812, are filtered to identify the customer location pairs with the shortest possible route and minimum transportation cost. The routes and transportation cost of the customer location pairs are compared with other customer location pairs to identify the customer location pairs with shortest possible route and minimum transportation cost. The customer location pairs C2 804 and C5 810, and C1 802 and C7 816 are filtered and identified as the customer location pairs with shortest possible route and minimum transportation cost.

Figure 9:
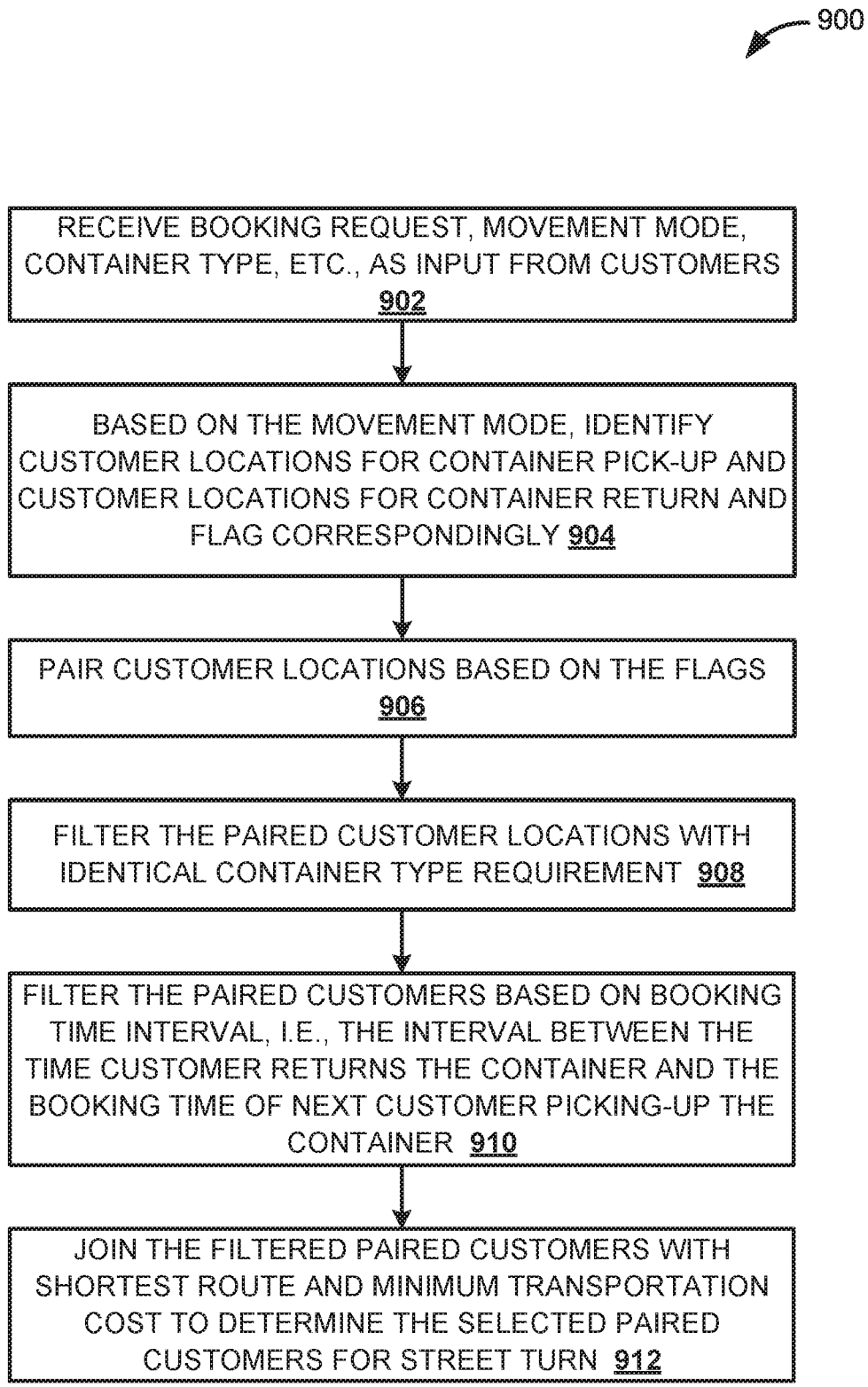
FIG. 9 is a flow chart illustrating execution of street turn solver algorithm to pair customer locations, according to one embodiment.

FIG. 9 is a flow chart 900, illustrating execution of street turn solver algorithm to pair customer locations, according to one embodiment. At 902, booking request, movement mode, container type, etc., are received as input from customers. At 904, based on the movement mode, customer locations for container pick-up and customer locations for container return are identified. The identified customer locations are flagged correspondingly. For example, customer locations for container return may be flagged 'yes', and customer locations for container return may be flagged 'no'. At 906, customer locations are paired based on the flags. For example, pairing may be performed between customers with a corresponding 'yes' and 'no' flag. At 908, the paired customer locations with identical container type requirements are filtered. At 910, the paired customers are filtered based on a booking time interval. The booking time interval is the interval between the time customer returns the container and the booking time of next customer to pick-up the container. At 912, the filtered paired customers are joined with shortest route and minimum transportation cost to determine the selected paired customers for street turn.

Figure 10:
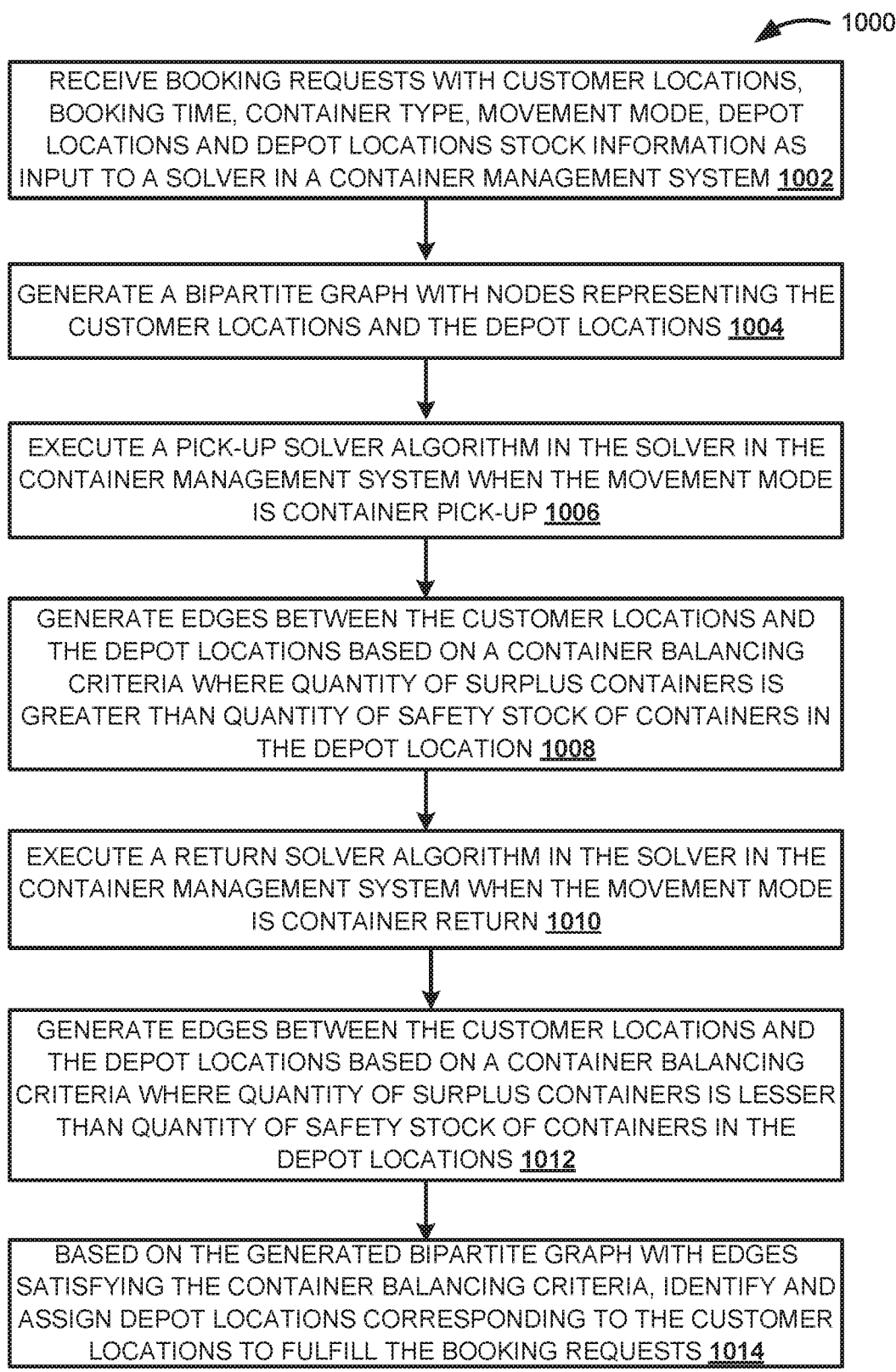
FIG. 10 is a flow chart illustrating optimized container management system, according to one embodiment.

FIG. 10 is a flow chart illustrating optimized container management system, according to one embodiment. At 1002, booking requests with customer locations, booking time, container type, movement mode, depot locations and depot locations stock information are received as input in a solver in a container management system. At 1004, a bipartite graph with nodes representing customer locations and depot locations are generated. At 1006, a pick-up solver algorithm is executed in the solver in the container management system when the movement mode is container pick-up. At 1008, edges between the customer locations and the depot locations are generated based on a container balancing criteria where quantity of surplus containers is greater than quantity of safety stock of containers in the depot location. At 1010, a return solver algorithm is executed in the solver in the container management system when the movement mode is container return. At 1012, edges between the customer locations and the depot locations are generate based on a container balancing criteria where quantity of surplus containers is lesser than quantity of safety stock of containers in the depot locations. At 1014, based on the generated bipartite graph with edges satisfying the container balancing criteria, depot locations corresponding to the customer are identified and assigned to fulfill the booking requests.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 11:
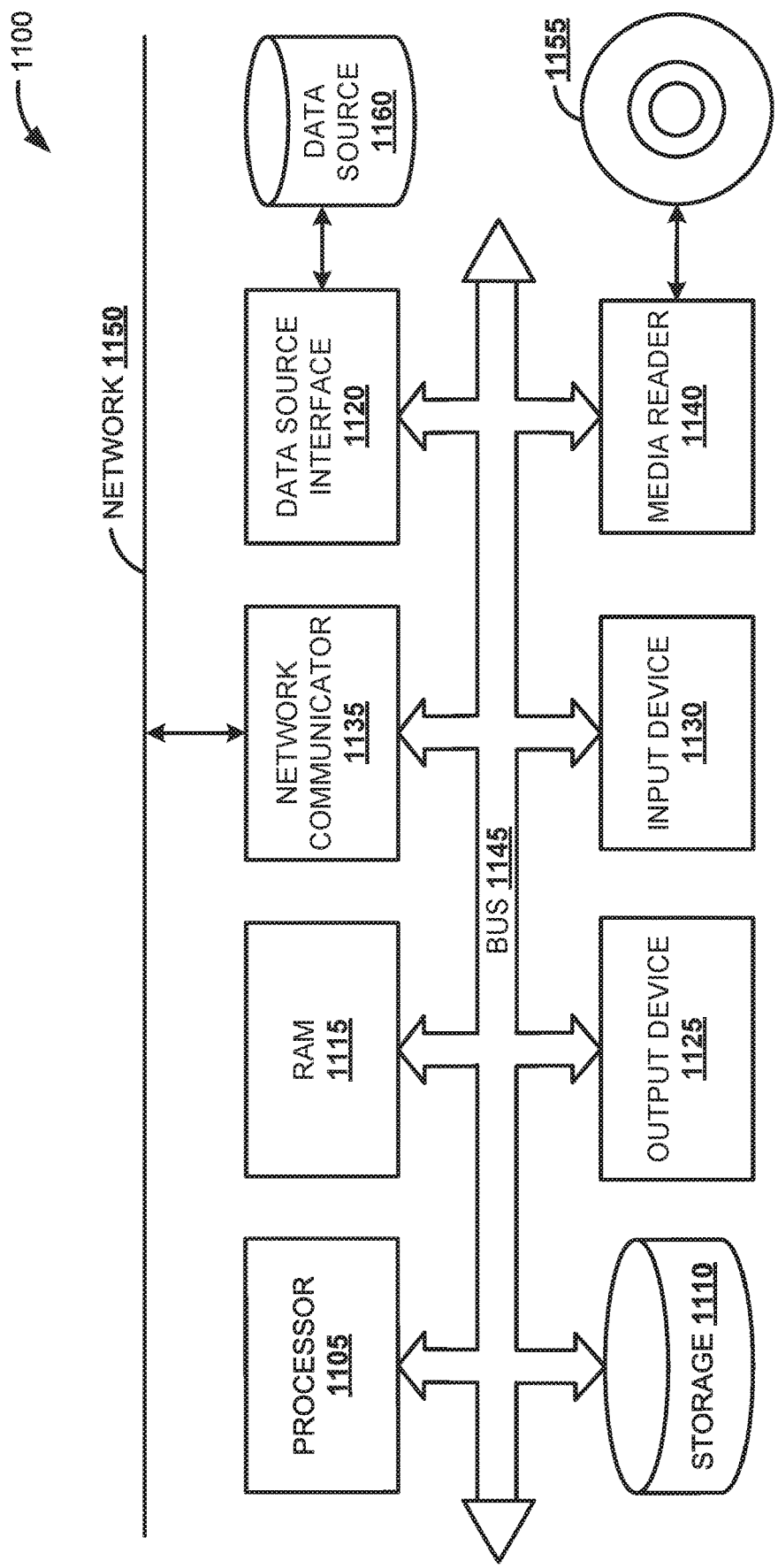
FIG. 11 is a block diagram illustrating an exemplary computer system, according to one embodiment.

FIG. 11 is a block diagram of an exemplary computer system 1100. The computer system 1100 includes a processor 1105 that executes software instructions or code stored on a computer readable storage medium 1155 to perform the above-illustrated methods. The computer system 1100 includes a media reader 1140 to read the instructions from the computer readable storage medium 1155 and store the instructions in storage 1110 or in random access memory (RAM) 1115. The storage 1110 provides a large space for keeping static data where at least some instructions could be stored for later execution. The stored instructions may be further compiled to generate other representations of the instructions and dynamically stored in the RAM 1115. The processor 1105 reads instructions from the RAM 1115 and performs actions as instructed. According to one embodiment, the computer system 1100 further includes an output device 1125 (e.g., a display) to provide at least some of the results of the execution as output including, but not limited to, visual information to users and an input device 1130 to provide a user or another device with means for entering data and/or otherwise interact with the computer system 1100. Each of these output devices 1125 and input devices 1130 could be joined by one or more additional peripherals to further expand the capabilities of the computer system 1100. A network communicator 1135 may be provided to connect the computer system 1100 to a network 1150 and in turn to other devices connected to the network 1150 including other clients, servers, data stores, and interfaces, for instance. The modules of the computer system 1100 are interconnected via a bus 1145. Computer system 1100 includes a data source interface 1120 to access data source 1160. The data source 1160 can be accessed via one or more abstraction layers implemented in hardware or software. For example, the data source 1160 may be accessed by network 1150. In some embodiments the data source 1160 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:

receive, as input from a transport management enterprise application, a plurality of booking requests and customer information, safety stock and maximum stock configuration information, and cost information associated with the plurality of booking requests at a solver in a container management system, wherein the plurality of booking requests include customer locations, booking time, container type, movement mode, and wherein the plurality of booking requests are automatically provided by the transport management enterprise application to trigger execution of a solver algorithm at the solver;

execute the solver algorithm implemented at the solver in the container management system, wherein the solver algorithm includes a pick-up solver, a return solver, and a street-turn solver, wherein the solver algorithm generates a bipartite graph including a plurality of nodes representing the customer locations and the depot locations for fulfilling the plurality of booking requests, and wherein based on a movement mode of a received booking request, at least one of the pick-up solver, the return solver, and the street-turn solver is automatically invoked;

in response to determining that the movement mode indicated at a first booking request is for a container pick-up, generate, by the pick-up solver at a first stage based on a pick-up container balancing criteria defined based on the received safety stock and maximum stock configuration information, an edge at the bipartite graph between a first customer location from the customer locations and a first depot location from the depot locations when the pick-up container balancing criteria is satisfied for the first depot location, wherein the first customer location is associated with the first booking request, and based on identifying a booking request that is not fulfilled with the pick-up container balancing criteria, generate, by the pick-up solver at a second stage based on a cost minimization criteria received as input at the solver, an edge between a customer location from the customer locations and a depot location from the depot locations based on the cost minimization criteria;

based on the bipartite graph and evaluation of edges between the customer locations and correspondingly associated depot locations based on the pick-up container balancing criteria and the cost minimization criteria, automatically generate a table including records associated with the customer locations defined with the plurality of booking requests and the correspondingly associated depot locations, wherein the table includes corresponding relations between the first customer location and a set of depot locations, and wherein a first record in the table defines a relation between the first customer location and the first depot location, a result value, a cost value, and an assigning identification information identifying that the first customer location is assigned to the first depot location, as an optimal pick-up depot location for the first customer location;

based on an evaluation of the table and the assigning identification information, determine, by the solver, optimal schedules and routes for the plurality of booking requests according to the pick-up container balancing criteria and if not satisfied based on the cost minimization criteria to fulfill the plurality of booking requests as input at the solver;

execute a return solver algorithm implemented at the return solver in the container management system when the movement mode is container return;

generate a set of edges, based on the executed return solver algorithm at the return solver, between the customer locations and the depot locations at the bipartite graph based on a return container balancing criteria;

based on the bipartite graph with the set of edges satisfying the return container balancing criteria, identify and assign a return depot location corresponding to the first customer location from the customer locations to fulfill a received booking request from the plurality of booking requests, the booking request is for return of containers at the first customer location of the customer locations;

in response to the received booking request, generate, by the return solver, a return route corresponding to the booking request for the first customer location, wherein the return route identifies the return depot location corresponding to the first customer location for transporting the return containers;

based on executing a street-turn solver algorithm at the street-turn solver, generate a path for repositioning of containers between two customer locations from the customer locations by generating an edge between the two customer locations based on a movement mode being street-turn, a specified booking time interval, the container type and an operation cost; and generate and transmit instructions from the street-turn solver for executing the repositioning of the containers based on the generated path.

2. The computer-readable medium of claim 1, further comprises instructions which when executed by the computer further cause the computer to:
execute the street-turn solver algorithm in the solver in the container management system when the movement mode is street-turn.

3. The computer-readable medium of claim 1, wherein a second record in the table defines a relation between the first customer location and a second depot location, a result value identifying whether the pick-up container balancing criteria for the second depot location is satisfied, the cost value related to costs for transportation from the first customer location to the second depot location, and the assigning identification information to determine whether the first customer location is assigned to the second depot location.

4. The computer-readable medium of claim 3, wherein the first record in the table includes the assigning identification information identifying that the first customer location is assigned to the first depot location, and the second record in the table includes an assigning identification information identifying that the first customer location is not assigned to the second depot location, when the pick-up container balancing criteria is not satisfied for the second depot location.

5. The computer-readable medium of claim 3, wherein the first record in the table includes the assigning identification information identifying that the first customer location is assigned to the first depot location, and the second record in the table includes the assigning identification information identifying that the first customer location is not assigned to the second depot location, when the pick-up container balancing criteria is satisfied for the second depot location, and wherein costs identified in the cost information of the first record are lower than costs identified in the cost information of the second record.

6. The computer-readable medium of claim 1, further comprises instructions which when executed by the computer further cause the computer to:
determine that a second booking request is an unfulfilled booking request when no depot location from the depot locations is identified for a second customer location in the pick-up container balancing criteria and the cost minimization criteria; and
display the unfulfilled booking request as an alert in a user interface of the container management system.

7. A computer-implemented method of optimized container management system, the method comprising:
receiving, as input from a transport management enterprise application, a plurality of booking requests and customer information, safety stock and maximum stock configuration information, and cost information associated with the plurality of booking requests at a solver in a container management system, wherein the plurality of booking requests include customer locations, booking time, container type, movement mode, and wherein the plurality of booking requests are automatically provided by the transport management enterprise application to trigger execution of a solver algorithm at the solver;
executing the solver algorithm implemented at the solver in the container management system, wherein the solver algorithm includes a pick-up solver, a return solver, and a street-turn solver, wherein the solver algorithm generates a bipartite graph including a plurality of nodes representing the customer locations and the depot locations for fulfilling the plurality of booking requests, and wherein based on a movement mode of a received booking request, at least one of the pick-up solver, the return solver, and the street-turn solver is automatically invoked;
in response to determining that the movement mode indicated at a first booking request is for a container pick-up,
generating, by the pick-up solver at a first stage based on a pick-up container balancing criteria defined based on the received safety stock and maximum stock configuration information, an edge at the bipartite graph between a first customer location from the customer locations and a first depot location from the depot locations when the pick-up container balancing criteria is satisfied for the first depot location, wherein the first customer location is associated with the first booking request, and
based on identifying a booking request that is not fulfilled with the pick-up container balancing criteria, generating, by the pick-up solver at a second stage based on a cost minimization criteria received as input at the solver, an edge between a customer location from the customer locations and a depot location from the depot locations based on the cost minimization criteria;
based on the bipartite graph and evaluation of edges between the customer locations and correspondingly associated depot locations based on the pick-up container balancing criteria and the cost minimization criteria, automatically generating a table including records associated with the customer locations defined with the plurality of booking requests and the correspondingly associated depot locations, wherein the table includes corresponding relations between the first customer location and a set of depot locations, and wherein a first record in the table defines a relation between the first customer location and the first depot location, a result value, a cost value, and an assigning identification information identifying that the first customer location is assigned to the first depot location, as an optimal pick-up depot location for the first customer location;
based on an evaluation of the table and the assigning identification information, determining, by the solver, optimal schedules and routes for the plurality of booking requests according to the pick-up container balancing criteria and if not satisfied based on the cost minimization criteria to fulfill the plurality of booking requests as input at the solver;
executing a return solver algorithm implemented at the return solver in the container management system when the movement mode is container return;
generating a set of edges, based on the executed return solver algorithm at the return solver, between the customer locations and the depot locations at the bipartite graph based on a return container balancing criteria;
based on the bipartite graph with the set of edges satisfying the return container balancing criteria, identifying and assigning a return depot location corresponding to the first customer location from the customer locations to fulfill a received booking request from the plurality of booking requests, the booking request is for return of containers at the first customer location of the customer locations;
in response to the received booking request, generating, by the return solver, a return route corresponding to the booking request for the first customer location, wherein the return route identifies the return depot location corresponding to the first customer location for transporting the return containers;

based on executing a street-turn solver algorithm at the street-turn solver, generating a path for repositioning of containers between two customer locations from the customer locations by generating an edge between the two customer locations based on a movement mode being street-turn, a specified booking time interval, the container type and an operation cost; and generating and transmitting instructions from the street-turn solver for executing the repositioning of the containers based on the generated path.

8. The method of claim 7, further comprising:

executing the street-turn solver algorithm in the solver in the container management system when the movement mode is street-turn.

9. The method of claim 7, further comprising:

determine that a second booking request is an unfulfilled booking request when no depot location from the depot locations is identified for a second customer location in the pick-up container balancing criteria and the cost minimization criteria; and displaying the unfulfilled booking request as an alert in a user interface of the container management system.

10. A computer system for optimized container management, comprising:

a computer memory to store program code; and a processor to execute the program code to:

receive, as input from a transport management enterprise application, a plurality of booking requests and customer information, safety stock and maximum stock configuration information, and cost information associated with the plurality of booking requests at a solver in a container management system, wherein the plurality of booking requests include customer locations, booking time, container type, movement mode, and wherein the plurality of booking requests are automatically provided by the transport management enterprise application to trigger execution of a solver algorithm at the solver;

execute the solver algorithm implemented at the solver in the container management system, wherein the solver algorithm includes a pick-up solver, a return solver, and a street-turn solver, wherein the solver algorithm generates a bipartite graph including a plurality of nodes representing the customer locations and the depot locations for fulfilling the plurality of booking requests, and wherein based on a movement mode of a received booking request, at least one of the pick-up solver, the return solver, and the street-turn solver is automatically invoked;

in response to determining that the movement mode indicated at a first booking request is for a container pick-up, generate, by the pick-up solver at a first stage based on a pick-up container balancing criteria defined based on the received safety stock and maximum stock configuration information, an edge at the bipartite graph between a first customer location from the customer locations and a first depot location from the depot locations when the pick-up container balancing criteria is satisfied for the first depot location, wherein the first customer location is associated with the first booking request, and based on identifying a booking request that is not fulfilled with the pick-up container balancing criteria, generate, by the pick-up solver at a second stage based on a cost minimization criteria received as input at the solver, an edge between a customer location from the customer locations and a depot location from the depot locations based on the cost minimization criteria;

based on the bipartite graph and evaluation of edges between the customer locations and correspondingly associated depot locations based on the pick-up container balancing criteria and the cost minimization criteria, automatically generate a table including records associated with the customer locations defined with the plurality of booking requests and the correspondingly associated depot locations, wherein the table includes corresponding relations between the first customer location and a set of depot locations, and wherein a first record in the table defines a relation between the first customer location and the first depot location, a result value, a cost value, and an assigning identification information identifying that the first customer location is assigned to the first depot location, as an optimal pick-up depot location for the first customer location;

based on an evaluation of the table and the assigning identification information, determine, by the solver, optimal schedules and routes for the plurality of booking requests according to the pick-up container balancing criteria and if not satisfied based on the cost minimization criteria to fulfill the plurality of booking requests as input at the solver;

execute a return solver algorithm implemented at the return solver in the container management system when the movement mode is container return;

generate a set edges, based on the executed return solver algorithm at the return solver, between the customer locations and the depot locations at the bipartite graph based on a return container balancing criteria;

based on the bipartite graph with the set of edges satisfying the return container balancing criteria, identify and assign a return depot location corresponding to the first customer location from the customer locations to fulfill a received booking request from the plurality of booking requests, the booking request is for return of containers at the first customer location of the customer locations;

in response to the received booking request, generate, by the return solver, a return route corresponding to the booking request for the first customer location, wherein the return route identifies the return depot location corresponding to the first customer location for transporting the return containers;

based on executing a street-turn solver algorithm at the street-turn solver, generate a path for repositioning of containers between two customer locations from the customer locations by generating an edge between the two customer locations based on a movement mode being street-turn, a specified booking time interval, the container type and an operation cost; and generate and transmit instructions from the street-turn solver for executing the repositioning of the containers based on the generated path.

11. The system of claim 10, wherein the processor further executes the program code to:

execute the street-turn solver algorithm in the solver in the container management system when the movement mode is street-turn.

12. The system of claim 10, wherein the processor further executes the program code to:
- determine that a second booking request is an unfulfilled booking request when no depot location from the depot locations is identified for a second customer location in the pick-up container balancing criteria and the cost minimization criteria; and
- display the unfulfilled booking request as an alert in a user interface of the container management system.

* * * * *